(12) United States Patent
Osborne

(10) Patent No.: US 8,210,805 B1  
(45) Date of Patent: Jul. 3, 2012

(54) EFFICIENT TURBINE

(76) Inventor: Lyle E. Osborne, South Bend, IN (US)

( * ) Notice: Subject to any disclaimer, the term of this patent is extended or adjusted under 35 U.S.C. 154(b) by 450 days.

(21) Appl. No.: 12/429,497

(22) Filed: Apr. 24, 2009

(51) Int. Cl.  
*F01D 1/02* (2006.01)

(52) U.S. Cl. ........................................ 415/203

(58) Field of Classification Search .............. 415/203, 415/244, 2 R; 416/185, 179, 180, 186 R, 416/3.1, 4.1; 60/39.44; 290/54, 43  
See application file for complete search history.

(56) References Cited

U.S. PATENT DOCUMENTS

| | | | | |
|---|---|---|---|---|
| 227,576 A | * | 5/1880 | Read | 415/141 |
| 1,333,509 A | | 3/1920 | Seewer | |
| 1,590,912 A | | 6/1926 | Scanavino | |
| 2,276,714 A | * | 3/1942 | Brown | 415/203 |
| 2,310,816 A | | 2/1943 | Taylor | |
| 4,076,447 A | * | 2/1978 | Granath et al. | 415/3.1 |
| 4,179,897 A | | 12/1979 | Hvizdos et al. | |
| 4,436,480 A | * | 3/1984 | Vary | 415/211.1 |
| 4,731,545 A | * | 3/1988 | Lerner et al. | 290/54 |
| 5,249,923 A | * | 10/1993 | Negus | 415/202 |
| 5,755,553 A | | 5/1998 | Laemthongsawad | |
| 6,309,179 B1 | * | 10/2001 | Holden | 415/202 |
| 6,655,907 B2 | * | 12/2003 | Brock et al. | 415/4.2 |
| 6,798,080 B1 | | 9/2004 | Baarman et al. | |
| 6,885,114 B2 | | 4/2005 | Baarman et al. | |
| 6,927,501 B2 | | 8/2005 | Baarman et al. | |
| 7,067,936 B2 | | 6/2006 | Baarman et al. | |
| 7,233,078 B2 | * | 6/2007 | Baarman et al. | 290/43 |
| 7,503,744 B1 | * | 3/2009 | Broome | 415/3.1 |

FOREIGN PATENT DOCUMENTS

| | | |
|---|---|---|
| JP | 60-216069 A | 10/1985 |
| JP | 04-175468 A | 6/1992 |

OTHER PUBLICATIONS

Steindorf, Sara and Regan, Tom, New Turbine Can Extract Energy From Flowing Water, CommonDreams.org, Aug. 1, 2008, 4 pages, https://www.commondreams.org/headlines01/0517-05.htm.

* cited by examiner

*Primary Examiner* — Alexander Gilman  
(74) *Attorney, Agent, or Firm* — Barnes & Thornburg LLP

(57) ABSTRACT

An efficient turbine having an impeller mounted to an axle. The impeller has a cylindrical center hub mounted on the axle, and a plurality of blades extend radially from the center hub. The blades are welded to the center hub and end plates at either end of the impeller. Watertight chambers for receiving water are formed by adjacent blades, the center hub, and the end plates. An inlet directs water into the impeller to rotate it. The blades have an arcuate shape with no part of the blade extending below the top of the inlet when the outer edge of the blade is aligned with the top of the inlet so that no counteracting torque works against rotation of the impeller. Compressed air becomes trapped in the chambers, and when the compressed air expels the water from the impeller, it reduces the velocity of the water to near zero with respect to the inlet.

9 Claims, 6 Drawing Sheets

EFFICIENT TURBINE

BACKGROUND OF THE INVENTION

Turbines for generating useful work from water are well known, and many blade types are available. Ideally water leaving a turbine would leave with zero velocity. This would mean that all of the velocity energy entering the turbine would be converted to rotational energy within the turbine for useful work. Pelton wheels are common; however, a great amount of the velocity energy in the water is wasted. The water in a pelton wheel may splatter out of the sides and, upon leaving the pelton wheel, the water still has remaining velocity. Other enclosed turbines are available to restrict water from leaving the sides of the turbine, but such designs still leave water with remaining velocity upon discharge from the turbine.

In addition to bringing the water to zero velocity, an ideal turbine would have blades shaped in such a way so that all of the velocity energy striking the blades would act to rotate the turbine in the same direction. In some turbines with curved blades, the curvature of the blades means that for certain positions of the blades part of the energy from the water will produce a counteracting torque that tends to rotate against the direction the turbine is rotating. Elimination of this counteracting torque would increase efficiency of the turbine.

In addition to poor utilization of available energy, inefficient turbines will require a larger head pressure to produce the same useful work as a more efficient turbine. Since an efficient turbine requires less head pressure, there are more available choices for locating an efficient turbine in places that do not have a large enough head to operate an inefficient turbine.

SUMMARY OF THE INVENTION

The present invention is an efficient turbine. The turbine has an impeller mounted to an axle. The impeller has a cylindrical center hub that is affixed to the axle, and a plurality of blades extend radially from the center hub. The blades span the length of the center hub and have an outer edge disposed outward of the center hub. End plates are mounted to the ends of the center hub and the ends of the blades. Watertight chambers for receiving water are formed by adjacent blades, the center hub, and the end plates. An inlet directs water into the impeller to rotate it. The blades have an arcuate shape and no part of the blade extends below the top of the inlet when the outer edge of the blade is aligned with the top of the inlet.

DETAILED DESCRIPTION OF INVENTION

Figure 1:
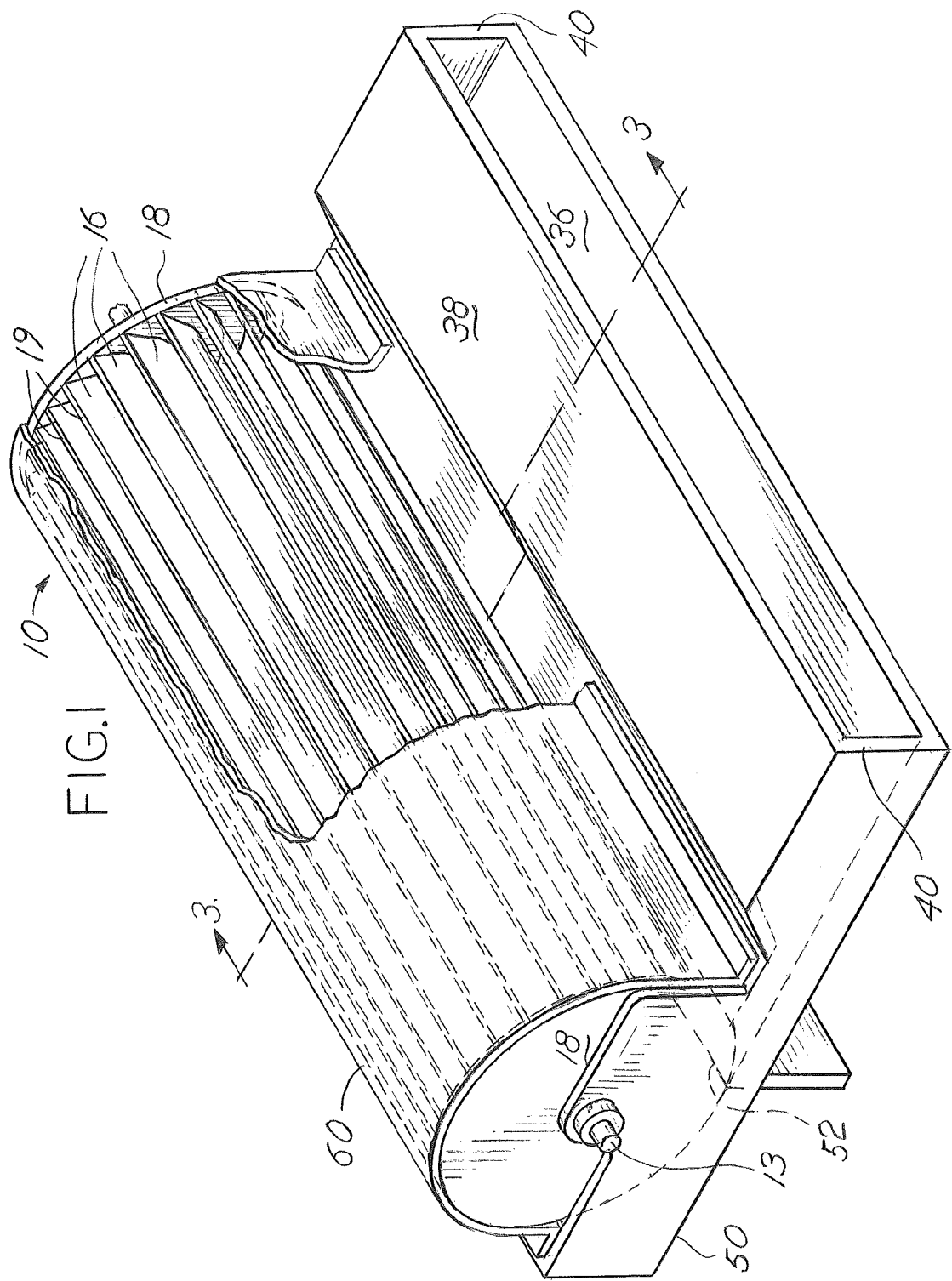
FIG. 1 is a perspective view of the turbine.
Figure 2:
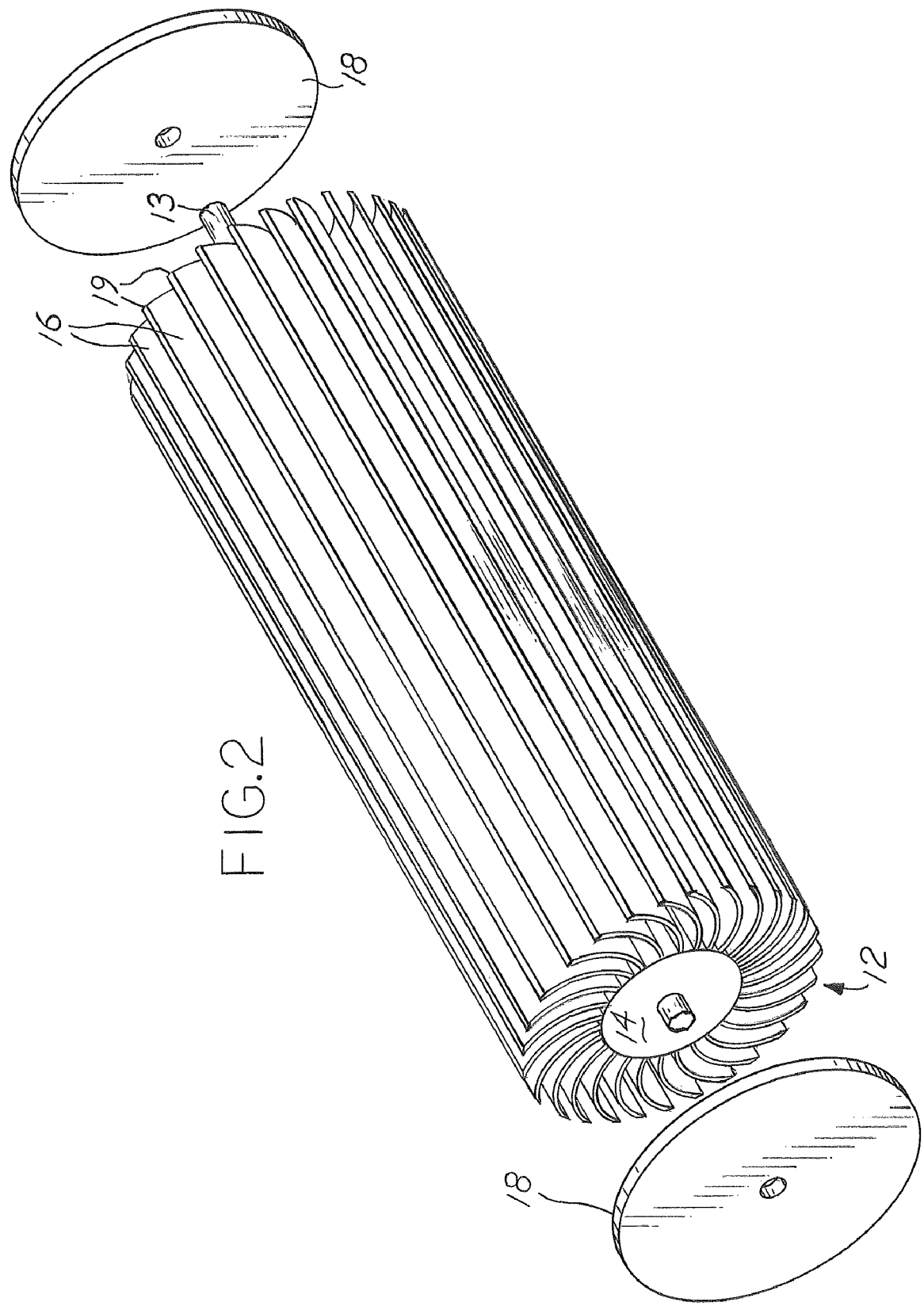
FIG. 2 is an exploded perspective view of the impeller.

The turbine 10 of this invention is shown in perspective in FIG. 1. The turbine 10 has an impeller 12 that is mounted to an axle 13. The impeller 12 includes a center hub 14 that is mounted to the axle 13. The axle 13 and center hub 14 rotate together. A plurality of blades 16 extend radially from the center hub 14 and span the length of the center hub 14. The blades have inner edges 17 and outer edges 19. Each blade 16 is attached to the center hub along its inner edge 17. End plates 18 are attached to the ends of the center hub 14 and the ends 17 of the blades 16. The center hub 14, blades 16, and end plates 18 may be made of any rigid material that can withstand constant contact with water. Typical materials that could be used are stainless steel or aluminum. The blades 16 are welded along their inner edge 17 to the center hub 14. The end plates 18 are welded to the ends of the center hub 14 and the ends 17 of the blades 16. Watertight chambers 21 are formed between adjacent blades 16, the end plates 18, and the center hub 14.

Figure 3:
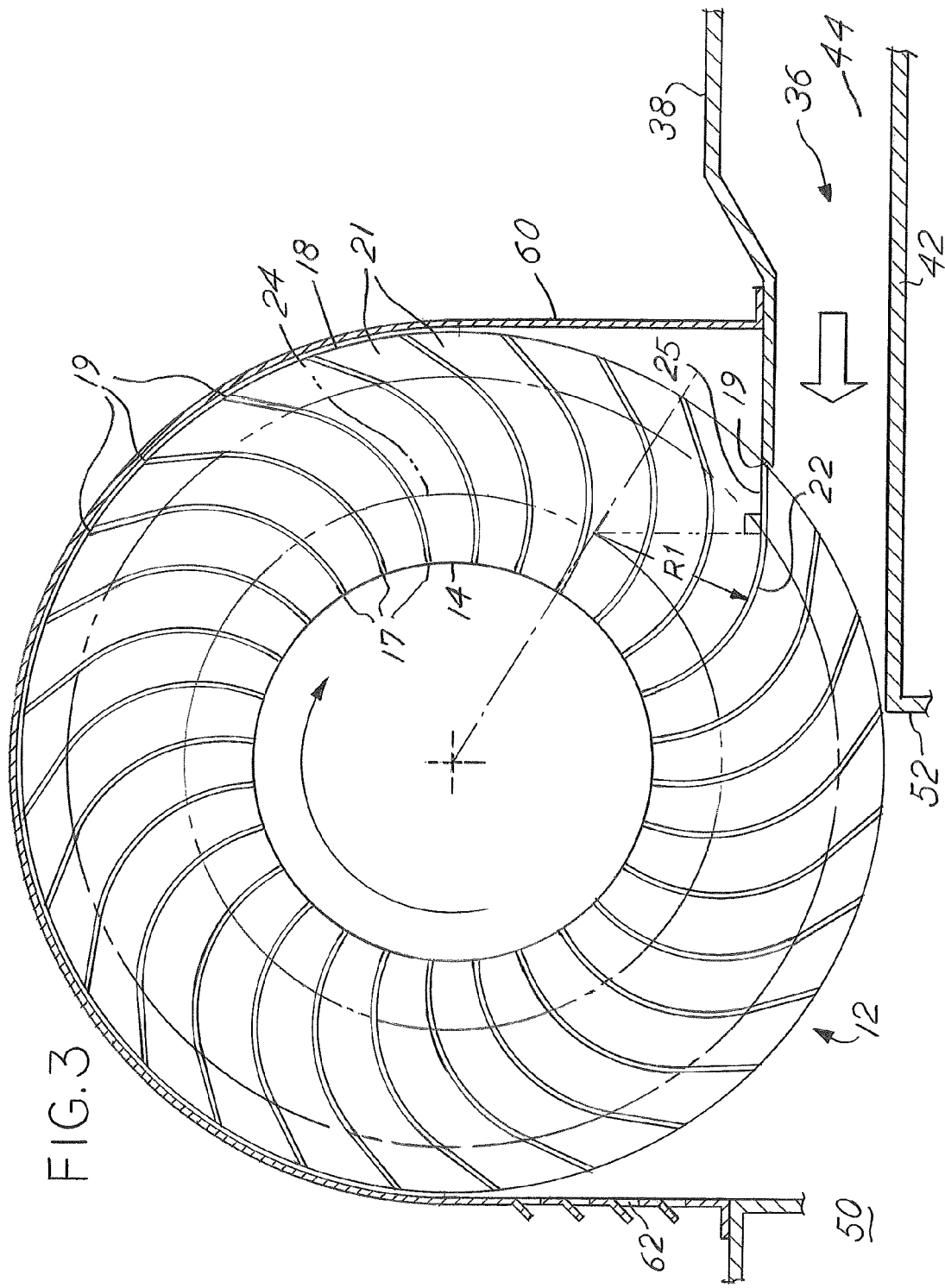
FIG. 3 is a sectional view of the turbine taken about the line 3-3 in FIG. 1.
Figure 4:
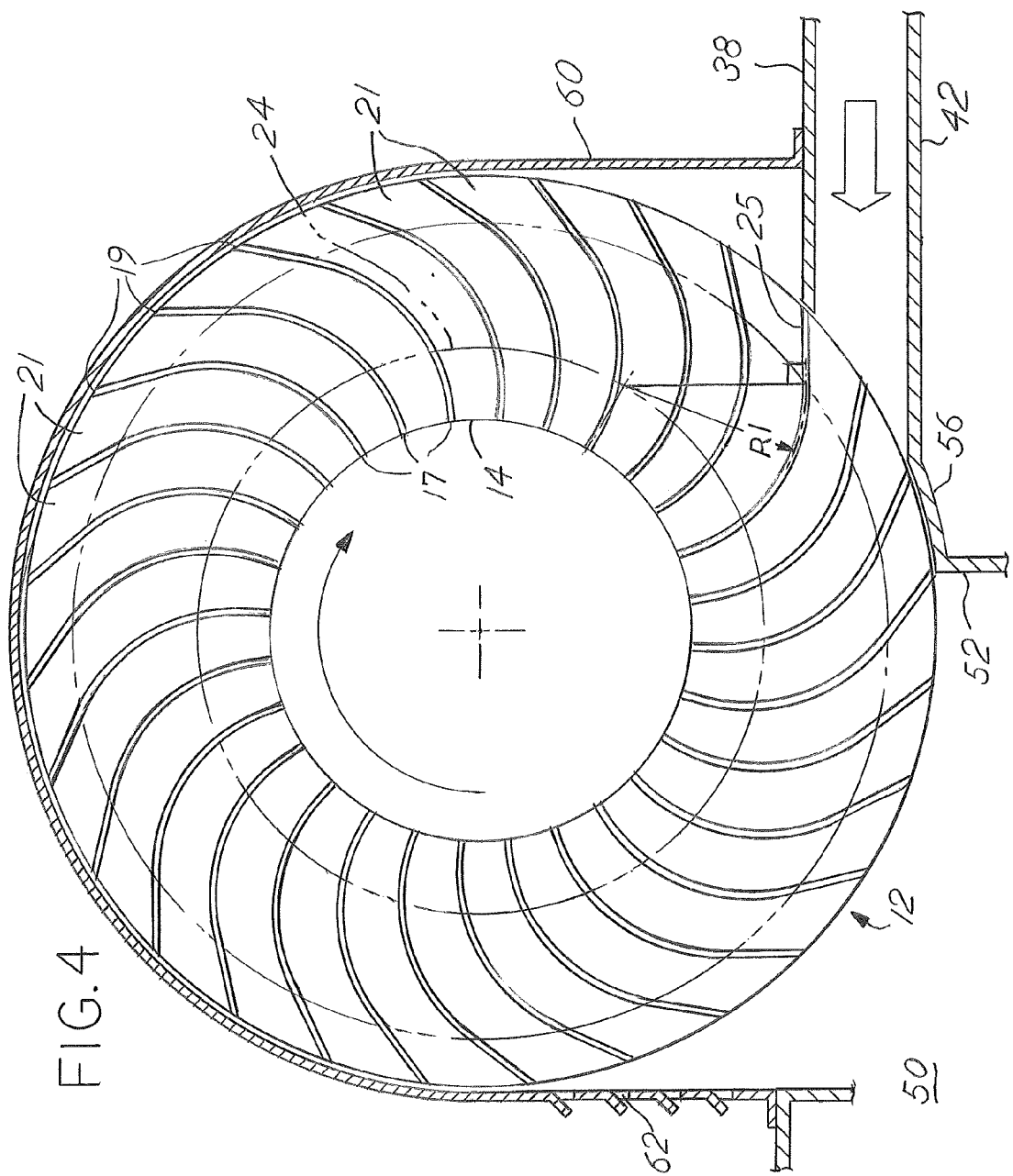
FIG. 4 is a sectional view showing a different embodiment of the turbine than that shown in FIG. 3.

FIGS. 3 and 4 show a sectional view of an embodiment of the blades 16. In this embodiment, each blade 16 is formed of a single piece of sheet metal that has a uniform cross section longitudinally. An arcuate segment 22 extends from the center hub 14 outward. The arcuate segment 22 has a radius R1 that is defined by a point on a pitch circle 24 having a diameter larger than the center hub 14. The arcuate segment 22 continues into a straight segment 25 that defines the outer edge 19 of the blade where the straight segment 25 ends.

Figure 5:
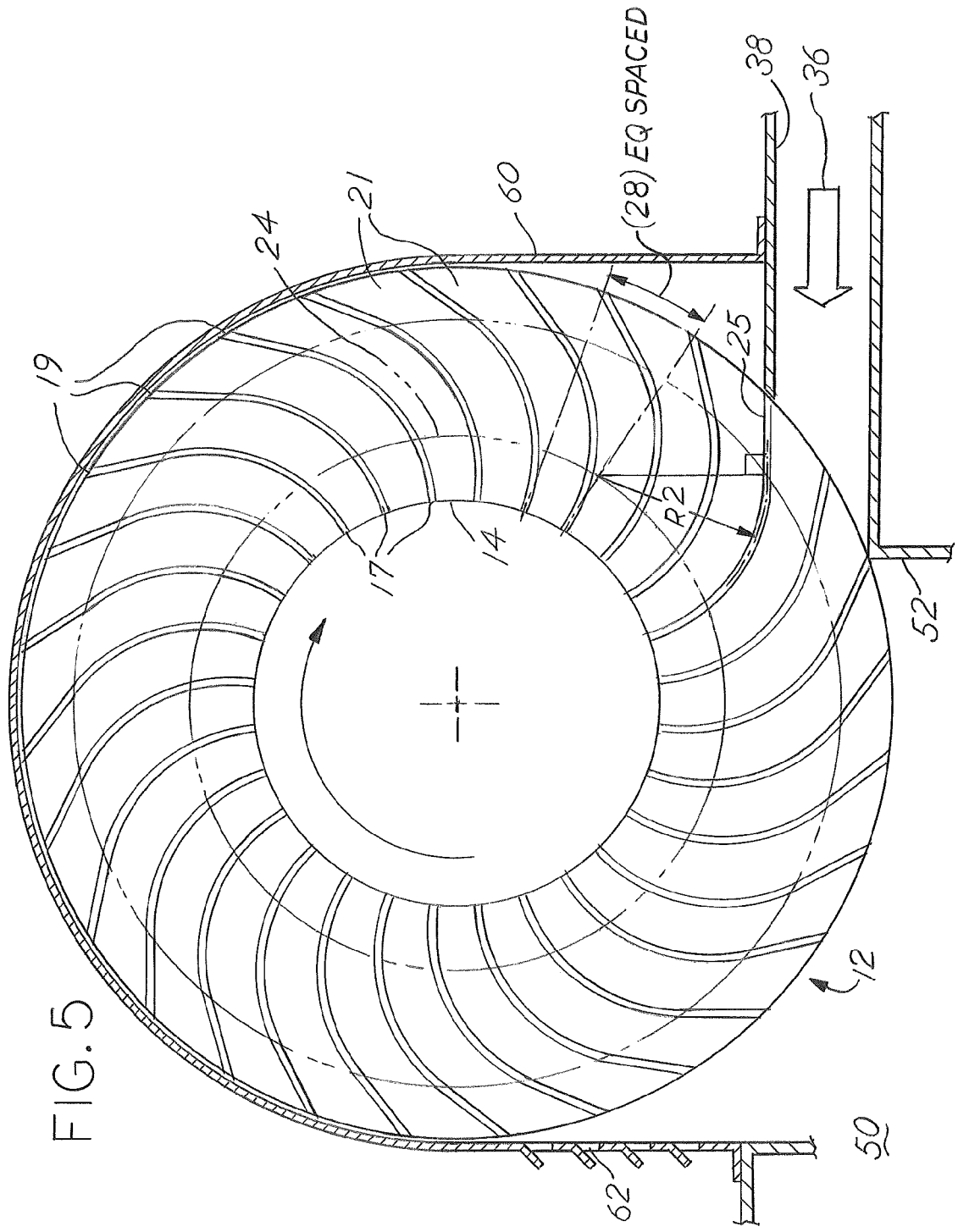
FIG. 5 is a sectional view showing a different embodiment of the turbine than that shown in FIG. 3 or 4.

Another embodiment of the blades 16 is shown in FIG. 5. In this embodiment the entire blade 16 is an arcuate segment without any straight segment. The radius for each blade R2 is defined by a point on pitch circle 30 that is larger than the center hub 14.

An inlet 36 directs water into the impeller 12. The inlet 36 has a top wall 38, opposite side walls 40, and a bottom 42. The inlet 36 spans the entire width of the impeller 12. The inlet in FIGS. 1 and 3 includes a wider portion 44 that may accept water from any source flowing into the turbine 10. The portion of the inlet 36 closest to the impeller 12 is designed to restrict water entering the blades 16 to approximately ⅛ of the diameter of the impeller 12.

Figure 6:
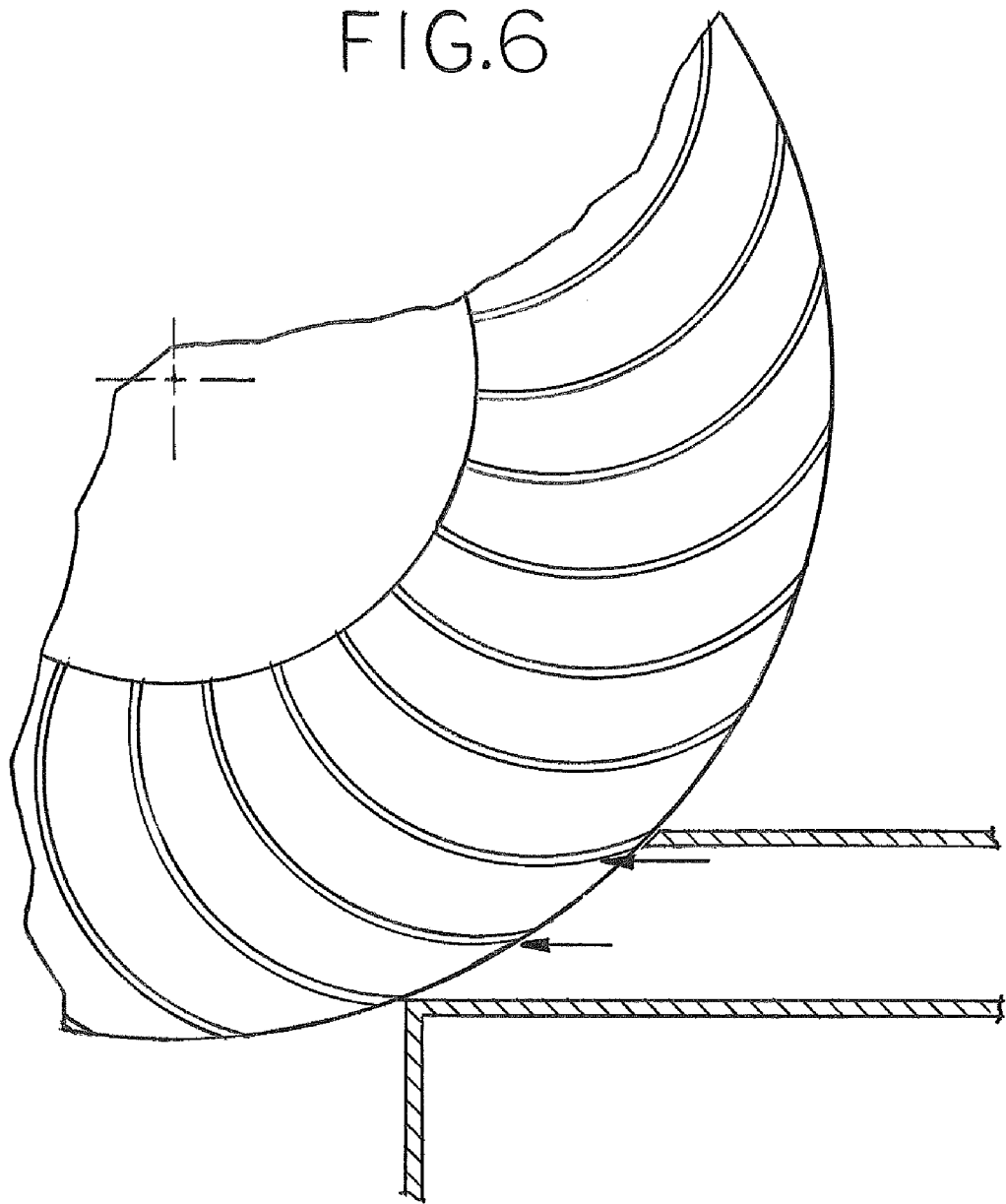
FIG. 6 is a sectional view showing the prior art design of a turbine.

The purpose of the inlet 36 is to fully direct water to produce useful rotation of the impeller 12. This is partly achieved by ensuring that all velocity of water entering the turbine 10 strikes the impeller 12 in a manner that imparts clockwise rotation as viewed in FIGS. 1-5. The shape of the blades with respect to the inlet serves this purpose. In both of the embodiments mentioned above, when the outer edge 19 of a blade is aligned with the top wall 38 of the inlet (hereinafter referred to as the aligned position), no part of the blade 16 will be below the top wall 38. When a blade 16 is in the aligned position, any portion of the blade 16 below the top wall 38 of the inlet 36 would tend to impart counterclockwise rotation as shown in FIG. 6 depicting the prior art. Since the lowest portion of the blade 16 is the outer edge 19, water can enter the chamber unobstructed.

The geometry of the blades 16 described in both embodiments mentioned above ensures that no counterclockwise rotation is imparted to the impeller 12 from water entering through the inlet 36. In the embodiment depicted in FIG. 4, the pitch circle 24 is chosen so that the lowest point on a blade 16 in the aligned position is where the arcuate segment 22 meets the straight segment 25. This means that R1 used to generate the arcuate segment 22 is perpendicular to the straight segment 25 and the top wall of the inlet 36 at the point where the straight segment 25 and arcuate segment 22 meet. FIG. 4 also shows that, in the aligned position, the straight segment 25 is collinear with the top wall 38 of the inlet. In the embodiment shown in FIG. 5, the lowest point on a blade 16 in the aligned position is the outer edge 19. In this case, the pitch circle 30 is chosen so that R2 used to generate the arcuate shape of the blade 16 is perpendicular to the inlet at the point defining the outer edge 19 of the blade. It is possible to vary the mentioned radiuses R1, R2 depending on the size of the impeller 12 as long as the aforementioned relationships are maintained.

Additional useful rotation is imparted to the turbine due to the reduction in average velocity to near zero upon discharge from the turbine. As water enters the watertight chambers 21, air within them will be compressed. This is particularly true when the height of the water in the inlet reaches the height of the top wall 38. The water will remain compressed until the chamber 21 containing the water reaches the discharge side 50 of the turbine 10. The bottom 42 of the inlet 36 terminates in a discharge wall 52 that extends downward and typically will terminate on a surface supporting the turbine 10. As a blade moves from the inlet 36 to the discharge side, the compressed air within the chamber 21 will expel the water against the discharge wall 52. As the water is expelled, it will move at a horizontal relative velocity of nearly zero relative to the inlet 36. Since the average velocity is reduced to near zero, the turbine will operate with great efficiency because the velocity energy will be converted into rotational energy imparted to the impeller 12.

An inlet configuration, such as that shown in FIG. 4, may be used to retain the water within the chambers 21 for an additional time until it is expelled. The outer edges 19 of the blades 16 are held in close proximity with a land 56 that is placed where the discharge wall 52 meets the bottom of the inlet 42. The land 56 is wide enough to span one chamber 21, meaning the span of two adjacent blades 16. As a chamber 21 passes by the land 56, the water will be retained and then discharged when the chamber 21 is opened to the discharge side 50 of the turbine.

The discharge side 50 of the turbine is in communication with atmospheric air pressure. A cover 60 is placed over the turbine 10 so that objects or animals will not become entangled with the blades 16. The cover 60 has vents 62 on the discharge side that are covered with a screen so that the compressed air is easily vented to atmospheric pressure.

This turbine is designed to take advantage of the velocity produced by the head of the water in the inlet. Such head may come from a retention area at the base of a large dam, or such velocity may come from a relatively low height differential in a body of water. Due to the efficient nature of this turbine, it is particularly well suited to take advantage of a relatively low head source of water. The turbine 10 may be used to turn a generator for generating hydroelectric power or may be used to perform other useful work.

The invention is not limited to the details given above, but may be modified within the scope of the following claims.

What is claimed is:

1. A turbine comprising:
   an axle;
   an impeller mounted to said axle including a cylindrical center hub affixed to said axle, a plurality of blades extending radially from said center hub spanning the length of said center hub and having an outer edge disposed outward of said center hub, end plates mounted to ends of said center hub and ends of said blades, watertight chambers for receiving water being formed by adjacent blades, said center hub, and said end plates;
   an inlet for directing water into said impeller to rotate said impeller; and
   said blades having a generally arcuate shape such that no part of said blade extends below the top of said inlet when said outer edge is aligned with the top of the inlet.

2. A turbine as claimed in claim 1, wherein when water is at a height of the top of said inlet, air becomes entrapped in said chambers by said water.

3. A turbine as claimed in claim 2, wherein said blades include a straight portion near said outer edge.

4. A turbine as claimed in claim 3, wherein the bottom of said inlet includes a land adjacent to a path traveled by said outer edges of said blade so that water is retained within said chamber as said chamber passes said land.

5. A turbine as claimed in claim 4, wherein said inlet directs water toward the lower eighth of the diameter of the impeller.

6. A turbine as claimed in claim 4, wherein said inlet is a continuous rectangular section that extends along the length of the impeller below the centerline of the impeller.

7. A turbine as claimed in claim 1, wherein each blade is defined by a radius extending form a pitch circle, said pitch circle having a diameter larger than the diameter of the center hub.

8. A turbine as claimed in claim 7, wherein said radius is perpendicular to said top of inlet at the outer edge of said blade when said outer edge of said blade is aligned with the top of said inlet.

9. A turbine as claimed in claim 7, wherein each blade includes a straight segment that is collinear with said top of said inlet when said outer edge of each of said blade is aligned with said top of said inlet and said radius is perpendicular to said straight segment where said straight segment meets an arcuate segment defined by said radius.

\* \* \* \* \*